United States Patent [19]

Levecque et al.

[11] 4,140,509

[45] Feb. 20, 1979

[54] METHOD AND APPARATUS FOR MAKING FIBERS FROM THERMOPLASTIC MATERIALS

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 834,543

[22] Filed: Sep. 19, 1977

Related U.S. Application Data

[63] Continuation-in-part of Ser. No. 780,589, Mar. 24, 1977, Pat. No. 4,070,173, Ser. No. 762,789, Jan. 25, 1977, and Ser. No. 676,755, Apr. 14, 1976, which is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Aug. 23, 1977 [FR] France .............................. 77 25693

[51] Int. Cl.$^2$ .............................................. C03B 37/04
[52] U.S. Cl. ............................................. 65/5; 65/16; 264/12; 425/7
[58] Field of Search .......................... 65/2, 5, 12, 16, 9; 425/7; 264/12

[56] References Cited

U.S. PATENT DOCUMENTS

| 2,318,243 | 5/1943 | McClure ................................. 65/9 |
| 3,874,886 | 4/1975 | Levecque et al. ................... 65/16 X |

*Primary Examiner*—Robert L. Lindsay, Jr.
*Attorney, Agent, or Firm*—John T. Synnestvedt; Kenneth P. Synnestvedt

[57] ABSTRACT

Method and equipment are disclosed for forming fibers from attenuable material such as molten glass, by the use of high velocity whirling gas currents or tornadoes. Attenuation is preferably effected in two stages, the first of which utilizes a pair of high velocity whirling currents or tornadoes formed by delivering a gaseous jet through a jet guiding device of trough-like form which is concavely curved, thereby developing a pair of counter-rotating tornadoes, with a zone of laminar flow therebetween, a stream of the attenuable material being delivered to the jet in the zone of laminar flow. A larger gaseous blast is also utilized being directed in a path intercepting the path of the jet to provide a zone of interaction also characterized by a pair of counter-rotating tornadoes, the stream of attenuable material being carried by the jet into the blast thereby subjecting the material to a second stage of attenuation in said zone of interaction.

7 Claims, 5 Drawing Figures

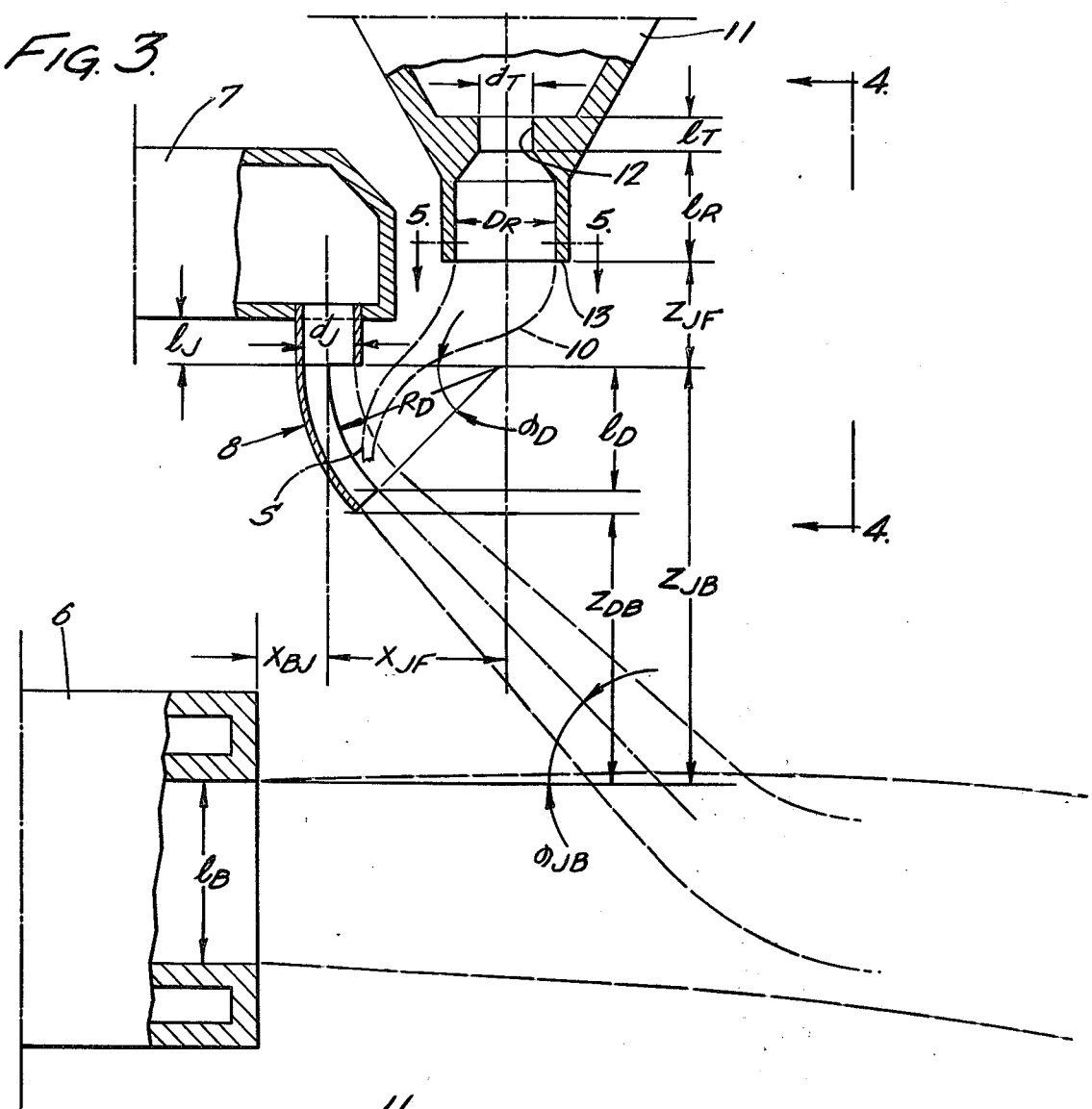
FIG. 3.
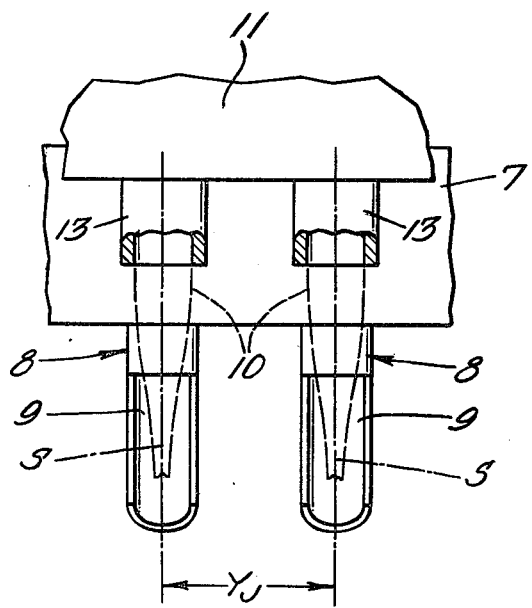
FIG. 4.
FIG. 5.

METHOD AND APPARATUS FOR MAKING FIBERS FROM THERMOPLASTIC MATERIALS

CROSS REFERENCES

The present application is a Continuation-in-Part of our prior applications Ser. No. 780,589, filed Mar. 24, 1977, now U.S. Pat. No. 4,070,173 Ser. No. 762,789, filed Jan. 25, 1977, and Ser. No. 676,755, filed Apr. 14, 1976, which in turn are Continuations-in-Part of our application Ser. No. 557,282, filed Mar. 11, 1975, now U.S. Pat. No. 4,015,964, which, in turn, is a Continuation-in-Part of our application Ser. No. 353,984, filed Apr. 24, 1973 and now issued as U.S. Pat. No. 3,885,940.

BACKGROUND AND OBJECTS

This invention relates to the formation of fibers from attenuable material and while the invention is adapted for use in the formation of fibers from a wide variety of attenuable materials, it is particularly suited to the attenuation of various thermoplastic materials, especially mineral materials such as glass and similar compositions which are rendered molten by heating. As with the technique of the prior applications above referred to, the present invention may be employed in connection not only with various mineral materials, but also with certain organic materials which are attenuable, such as polystyrene, polypropylene, polycarbonate and polyamides. Since the equipment or apparatus is especially useful in the attenuation of glass and similar thermoplastic materials, the following description refers to the use of glass by way of illustration.

Certain techniques for utilizing whirling currents or tornadoes for the attenuation of molten glass have been disclosed by us in prior applications above identified, such techniques being identified as toration. For example, U.S.A. Pat. No. 3,885,940, above identified, and also the companion U.S.A. Pat. No. 3,874,886, disclose development of pairs of counter-rotating tornadoes by directing a gaseous jet into a larger gaseous blast, thereby creating a zone of interaction including pairs of such tornadoes, and into which zone a stream of molten glass is delivered, with resultant attenuation of the glass stream.

In the equipment illustrated in said prior U.S.A. Pat. Nos. 3,885,940 and 3,874,886, the orifice from which the glass stream is delivered to the zone of interaction is located at or adjacent to the boundary of the blast. In our prior U.S. Pat. No. 4,015,954, toration arrangements are disclosed in which the glass orifice is positioned in spaced relation to the boundary of the blast, and in which the glass stream is delivered by gravity from an orifice spaced from the blast to the zone of interaction established by the interaction of a jet and a larger blast.

In prior applications Ser. Nos. 762,789, 676,755 and 780,589, both the glass orifices and the jet orifices are spaced from the boundary of the blast, and the glass streams are delivered to the jets and by the action of the jets are delivered into zones of interaction of the jets with the blast. In the applications just mentioned, the glass streams are also subjected to two stages of attenuation, one stage occuring in the jet and the other in the blast.

Still further in our application Ser. No. 762,789, the secondary or carrier jet which delivers the glass into the zone of interaction with the blast is caused to develop a stable zone of laminar flow lying between a pair of counter-rotating whirls or tornadoes formed in the jet flow upstream of the zone of penetration into the blast, and the glass stream is delivered to the laminar zone and thereafter enters the region of the tornadoes of the carrier jet, which latter merge downstream of the carrier jet, but before the carrier jet reaches the principal blast. As is pointed out in our application Ser. No. 762,789, the operation just described results in a two-stage attenuation, the first stage taking place as the glass stream is advanced into the influence of the tornadoes of the carrier jet, and the second stage taking place after the carrier jet and the partially attenuated stream enter the zone of interaction of the carrier jet with the blast.

According to the disclosure of said application Ser. No. 762,789, the zone of laminar flow and the tornadoes of the carrier jet are developed as a result of deflection of individual carrier jets provided for each fiberizing center and, as is brought out in said application Ser. No. 762,789 such deflection of a carrier jet contributes to stability of introduction of the glass into the system, notwithstanding the delivery of the glass to the carrier jet at a point spaced appreciably from the boundary of the principal blast.

The present invention, in common with application Ser. No. 762,789, has as a major objective, the stabilizing of the stream of glass or other attenuable material by development of a zone of laminar flow between tornadoes established in a jet flow system. However, the jet flow system of the present invention is somewhat different than that of said prior application, but it also provides various of the advantages thereof together with certain other advantages which are distinctive to the technique of the present invention.

In accordance with the present invention, jet guiding or deflecting means are employed at each fiberizing center. Instead of employing a jet deflector or baffle of the kind disclosed in application Ser. No. 762,789, the individual jets are each delivered into a concavely curved trough-like jet guiding device, conveniently in the form of a curved tube or elbow having the concave or inner wall removed, and the stream of attenuable material is introduced into the jet flow in the region where the inner wall of the tube has been removed. Thus, the stream of attenuable material is delivered to the jet in the region where the jet is flowing through the concavely curved trough-like guide.

Because of the guiding action of the sides of the trough-like portion of the guide and because of the induction of air or other ambient gas, each jet develops a pair of whirls or tornadoes, with a central generally laminar flow region lying between the tornadoes, and the stream of attenuable material is introduced into the zone of laminar flow between the tornadoes. In consequence, a preliminary attenuation of the stream of attenuable material is effected in the jet flow.

The invention also contemplates using the foregoing jet flow system in combination with a gaseous blast directed in a manner to intercept the jet and it is contemplated that the kinetic energy per unit of volume of the jet be greater than that of the blast and further that the cross sectional dimension of the jet be smaller than that of the blast in a direction transversely of the blast, so that the jet penetrates the blast and develops a zone of interaction between the jet and blast, which zone is of the type characterized by counter-rotating tornadoes, thereby providing for a second stage of attenuation, according to the toration type of technique more fully explained in the prior applications above referred to and also in the parent U.S. Pat. No. 3,885,940.

In the technique of the prior application Ser. No. 762,789, a series of jets are generated in a side-by-side relation and with a spacing sufficiently close to provide for impingement of the jets upon each other at least downstream of the edge of the deflector plate, so that the impingement of the jets upon each other aids in developing the counter-rotating tornadoes in pairs at opposite sides of a zone of substantially laminar flow. In contrast with the foregoing, in the system of the present invention, the pair of the tornadoes with the intervening zone of substantially laminar flow is generated without impingement of adjacent jets upon each other, in view of which according to the technique of the present invention any desired spacing of the jets may be adopted.

Because of the development of tornadoes in the curved guide element, the tornadoes of the pair developed in each jet have the same directions of rotation as the tornadoes in the zone of interaction of the jet flow with the blast. In view of this, any residual rotation of the tornadoes of the jets will reinforce the toration tornadoes in the zone of interaction of the jets with the blast.

The arrangement of the present invention as briefly described above, provides an effective technique for fiberizing attenuable material and in which each stream of attenuable material is preferably subjected to a two stage attenuation without, however, fragmenting the stream. The foregoing and various other objects and advantages will be brought out more fully hereinafter in the following detailed description of the invention in connection with the accompanying drawings.

BRIEF DESCRIPTION OF DRAWINGS

FIG. 3 is an enlarged vertical sectional view through the components of one fiberizing center taken in the plane of the jet and of the device for delivering the stream of attenuable material to the jet, this view also showing a portion of the blast generating means and particularly illustrating certain dimensions to be taken into account in establishing operating conditions in accordance with the preferred practice of the present invention;

FIG. 4 is a fragmentary elevational view taken substantially as indicated by the line 4—4 on FIG. 3; and FIG. 5 is a horizontal sectional view through a portion of the delivery means for the attenuable material, also indicating certain dimensions to be taken into account.

DETAILED DESCRIPTION

As above mentioned since the technique of the present invention is especially useful in the attenuation of glass and similar thermoplastic materials, the following description refers to the use of glass as the thermoplastic material.

Figure 1:
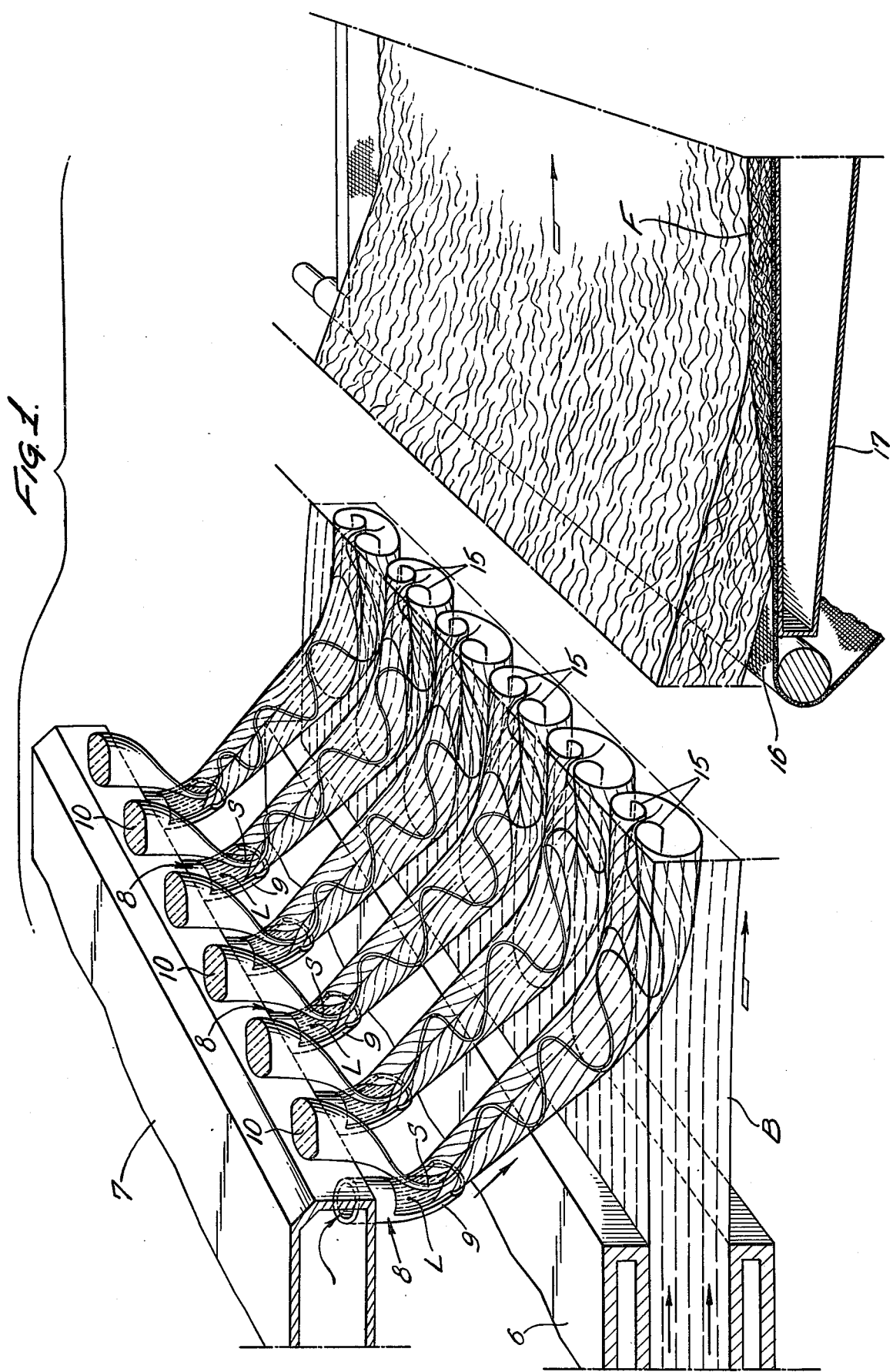
FIG. 1 is a somewhat diagrammatic perspective view of the major fiber producing and collecting components of a system according to the present invention incorporating a plurality of fiberizing centers each arranged in the manner above briefly described, the view illustrating certain parts in section, and one portion of the system being broken out in order to facilitate illustration of certain characteristics of the system.

Referring first to the general arrangement of the components of the fiberizing system of the invention, particular reference is made to FIG. 1 which somewhat diagrammatically illustrates an installation embodying a plurality of fiberizing centers.

A blast delivery device is indicated at 6. This may comprise a delivery nozzle associated with a burner, thereby delivering a hot gaseous blast of the products of combustion, the blast being indicated at B. The blast is desirably of greater width or transverse dimension than the jets to be described below.

A manifold 7 for supplying the gas for the jets, for instance compressed air, is arranged in spaced relation to the blast delivery device and a series of jet delivery devices 8 are associated with orifices in the jet manifold 7.

Each of the devices 8 (see also FIG. 2) is conveniently formed of a bent tube or elbow, of either constant or varying radius, one end of which is secured in an orifice in the manifold wall. The concave portion, for instance about one-half of the elbow is cut away or removed, thereby leaving a trough shaped delivery and deflecting device 9.

Figure 2:
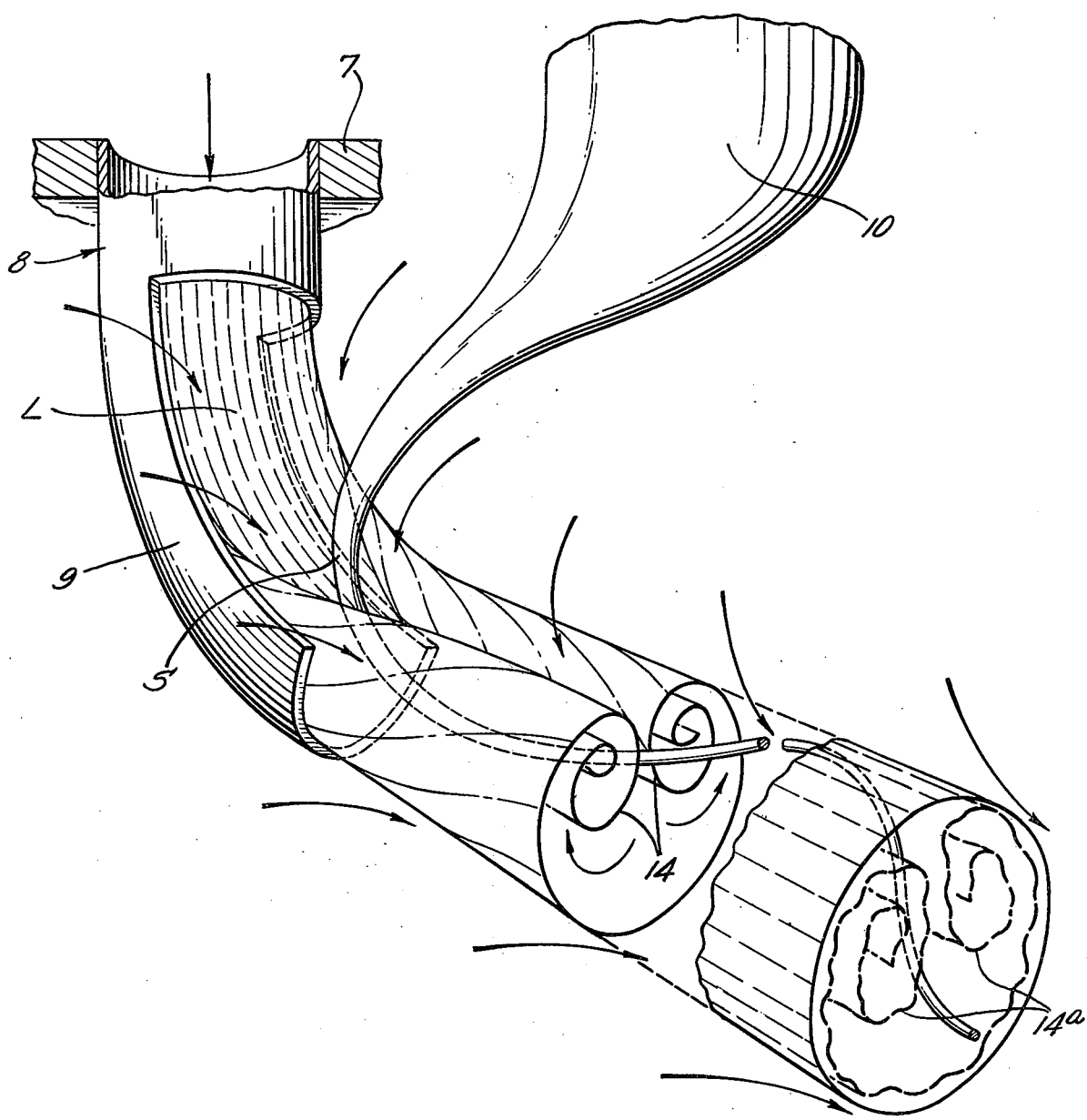
FIG. 2 is an enlarged fragmentary perspective view of one of the jet generating and guiding devices and of the jet flow developed thereby, and further showing the delivery of a stream of attenuable material to the jet flow.

As seen in FIG. 2, a glass bulb or cone 10 is associated with each of the jet delivery devices, the glass cone being delivered from an appropriate supply device not shown in FIGS. 1 or 2 but illustrated in FIGS. 3, 4 and 5. Thus, a bushing 11 is shown in FIG. 3, this bushing desirably being of width sufficient to overlie the series of jets, and the bushing being provided with a series of glass delivery devices, each including a metering orifice 12 and a delivery reservoir 13.

From the above it will be seen that each fiberizing center includes a jet delivery device and a glass delivery device associated with each other and in addition associated with the blast, and each one of the fiberizing centers operates to produce a single filament.

In considering the action occurring at each fiberizing center, attention is directed to the enlarged view of FIG. 2 which somewhat diagrammatically illustrates the action which occurs in the delivery or discharge or each jet. Because of the curvature of the jet delivery device 9 and because of the shielding of the lateral sides of the jet in the trough of the element 9, there is a tendency to develop whirling currents or tornadoes adjacent the opposite sides of the concave trough 9, these tornadoes being indicated in FIG. 2 at 14, the direction of rotation being shown by the arrows. The tornadoes 14 have their apices or points of origin adjacent the side walls of the concave trough of the device 8, and the tornadoes develop and enlarge in the downstream direction, progressively merging with the intermediate laminar flow portion L of the jet. The zone of substantial laminar flow is characterized by pronounced inflow of induced air, indicated by the arrows on FIG. 2, and this air induction tends to draw the stream of glass from the bulb or cone 10 and to cause that stream to enter the jet flow in the laminar flow region between the tornadoes 14.

In FIG. 2 attention is called to the fact that the jet flow is broken out downstream of the point where the reference numeral 14 is applied to the tornadoes, and the tornadoes gradually merge in the downstream direction and become less distinct, as is indicated by the dash line illustration toward the lower right corner in FIG. 2. Comparison of FIGS. 1 and 2 also shows that the tornadoes of the pair developed in each jet and the tornadoes developed as a result of penetration of the jet into the blast, have the same directions of rotation.

Induction of air into the jet continues and the jet flow then proceeds downstream at an inclined angle as illustrated particularly in FIG. 1 so that each jet penetrates and meets the blast B, with resultant attenuating action referred to hereinafter.

As above mentioned, the stream of glass enters the zone of laminar flow of the jet intermediate the developing tornadoes, this entry of the stream being indicated at S in FIG. 2. The stream is then advanced by the action of the tornadoes and is in fact subjected to a preliminary attenuation by the jet action in the zone between the pair of tornadoes, thereby progressively diminishing the size of the stream to form a filament. The entry of the glass stream S into the zone of substantially laminar flow is of advantage for several reasons including the fact that the absence of turbulence in the zone into which the glass is introduced diminishes tendency to fragment the glass stream, and thereby assists in producing filaments or fibers of substantial length. In addition, the induced air currents in the region of the zone of laminar flow tend automatically to draw the glass stream into the mid region between the tornadoes, and this tendency is of sufficient magnitude to automatically compensate for some misalignment of the glass delivery orifice in relation to the jets.

Although, the attenuation of the glass stream effected in the influence of the jet may be sufficient to provide a fiber product useful for certain purposes, it is preferred to effect further attenuation in the influence of the blast, as described herebelow, and the fiber will thereby be subjected to two sequential stages of attenuation.

As seen in FIG. 1, the second stage of attenuation occurs as a result of the penetration of the jet into the blast, thereby establishing a zone of interaction in which the attenuation occurs in consequence of toration, such toration being extensively analyzed and considered in various of the parent applications and patents above identified, especially in the U.S.A. Pat. No. 3,885,940 and also in copending application Ser. No. 762,789.

For the purposes of effecting toration, the jet is directed toward and penetrates the blast. Such penetration occurs in consequence of employment of a jet having a kinetic energy per unit of volume which is greater than that of the blast. In addition, the cross section or at least the cross sectional dimension of the jet should be smaller than that of the blast in a direction transverse of the blast. The dimensional and kinetic energy relationships just referred to, should exist at the zone of penetration of the jet into the blast, and since, in accordance with the present invention, the jet flow at the time of penetration into the blast is made up of the merged tornadoes 14a and the induced air, it is necessary to employ jets of higher kinetic energy at the point where the jet is discharged through the orifice in the wall of the jet manifold 7.

As explained in the parent patent and application above referred to, the penetration of the jet flow into the blast results in the development of a pair of tornadoes which appear in FIG. 1 at 15 in the region where the jet and blast have been broken out. The pairs of tornadoes 15 are also counter-rotating in the senses indicated in FIG. 1, and at each fiberizing center, the partially attenuated stream or filament is subjected to an additional attenuating force under the influence of the high velocity currents associated with the tornadoes 15, thereby effecting a second stage of attenuation and producing a fine fiber.

The fibers produced in this way as a result of the action of the several fiberizing centers in an installation such as diagrammatically illustrated in FIG. 1 are appropriately collected, for instance by being laid down on a perforated fiber collector such as indicated at 16 in FIG. 1. This conveyor travels over one or more suction boxes such as shown in 16 in consequence of which the fibers are laid down as a fiber blanket or mat F on the moving conveyor 16 in the general manner illustrated in FIG. 1 and more fully described in various of applicant's prior applications and patents.

It will be understood that an appropriate binder such as a resin binder may be sprayed upon the fibers, for instance in the region of the zone broken out in FIG. 1, and the binder carrying fiber may may be delivered by the conveyor 16 to an appropriate facility, such as an oven, for curing the binder.

As above indicated, it is desired to employ a jet having a greater kinetic energy per unit of volume than that of the blast regardless of the temperature of the gases. This may be achieved in various ways, for instance by utilizing for the jet and blast gas supplies originating with burners, so that both of them are at elevated temperatures, and therefore at low density, and in this event, the desired high kinetic energy of the jet may be attained by employing a jet velocity higher than that of the blast. On the other hand, it is also possible to establish the desired kinetic energy relationship by employing a jet of relatively low temperature, and therefore of high density, for instance compressed air at room temperature, the blast being generated by the use of relatively high temperature combustion products, and in this case, the velocity of the jet need not be as high as where the jet is generated from high temperature gases. Indeed, with a relatively low temperature jet, the velocity of the jet may even be lower than the velocity of the blast and still provide the desired kinetic energy relationship between the jet and blast, i.e. a relationship in which the kinetic energy per unit of volume of the jet is higher than that of the blast so that it will penetrate into the blast and thus provide the desired toration zone of interaction between the jet and blast.

Turning now to FIGS. 3, 4 and 5, it is noted that these figures indicate the relationship between the three major components of a fiberizing center, i.e. the means for developing the blast, the means for developing the jet and the means for introducing the attenuable material. In these figures, symbols or legends have been applied to refer to various parameters, such as ranges and angles, all of which are referred to in one or another of the tabulations herebelow. The tables give not only appropriate ranges, but also indicate certain preferred values.

In considering the symbols and legends, reference is first made to Table I indicating values for the bushing 11 and the devices for the supply of the attenuable material.

TABLE I

| Symbol | (mm) Preferred Value | Range |
|---|---|---|
| $d_T$ | 2 | 1→5 |
| $l_T$ | 1 | 1→5 |
| $l_R$ | 5 | 0→10 |
| $d_R$ | 2 | 1→5 |

TABLE I-continued

| | (mm) | |
|---|---|---|
| Symbol | Preferred Value | Range |
| $D_R$ | 5 | 1→10 |

With reference to the jet supply, see the following table.

TABLE II

| | (mm, degree) | |
|---|---|---|
| Symbol | Preferred Value | Range |
| $d_J$ | 2 | 0.5→4 |
| $l_J$ | 3 | 1→15 |
| $Y_J$ | 5 | 1.0→ |
| $\alpha D$ | 45° | 20°→90° |
| $\dfrac{R_D}{d_J}$ | 2.5 | 2→3 |

With regard to the blast, note the following table.

TABLE III

| | (mm) | |
|---|---|---|
| Symbol | Preferred Value | Range |
| $l_B$ | 10 | 5→20 |

Certain interrelationships of the components are also to be noted, as given in the table just below.

TABLE IV

| | (mm, degree) | |
|---|---|---|
| Symbol | Preferred Value | Range |
| $\alpha JB$ | 45° | 20°→90° |
| $X_{BJ}$ | −5 | +10→−20 |
| $X_{JF}$ | 5 | 1→8 |
| $Z_{JF}$ | 5 | 0→15 |
| $Z_{JB}$ | 20 | 15→35 |
| $Z_{DB}$ | 16 | 0→30 |
| $\dfrac{l_D}{d_J}$ | 2 | 1→3 |

In connection with the symbol $X_{BJ}$, it will be noted that in the illustration of FIG. 3, $X_{BJ}$ is indicated at a negative value, i.e. with the blast nozzle in a positive (in relation to the direction of flow of the blast) which is upstream of the position of the jet.

With reference to the dimension $Z_{DB}$ it will be noted that it is contemplated that the lower edge of the deflector may be positioned at the boundary of the blast, and in this event the tornadoes of the jet continue into and reinforce the tornadoes formed in the toration or interaction zone in the blast, thereby providing improved continuity of the attenuation effects of the jet flow and the blast.

The number of fiberizing centers may run up to as many as 150, but in a typical installation where glass or some similar thermoplastic material is being fiberized, a bushing having 70 delivery devices or orifices is appropriate.

The term "supply orifice" for attenuable material used in the description is to be interpreted in a broad sense; it can mean either an isolated orifice carrying material toward a jet flowing in a deflector, or a feed slot associated with a row of jets, or a series of orifices. The row of orifices can be replaced by a slot disposed transversely to the flow of the blast, downstream of a row of jets and associated deflectors, attenuable material issuing from the slot thereby being divided by the action of the jets including the induced air currents, into a series of cones with streams of the material extending from the cones and entering the laminar zones of the individual jets.

In connection with the operating conditions, it is first pointed out that the conditions of operating the system according to the present invention will vary in accordance with a number of factors, for example in accordance with the characteristics of the material being attenuated.

As above indicated, the system of the present invention is capable of use in the attenuation of a wide range of attenuable materials. In the attenuation of glass or other inorganic thermoplastic materials, the temperature of the bushing or supply means will of course vary according to the particular material being fiberized. The temperature range for materials of this general type may fall between about 1400° and 1800° C. With a typical glass composition, the bushing temperature may approximate 1480° C.

The pull rate may run about 20 to 150 kg/hole per 24 hours, typical values being from about 50 to about 80 kg/hole per 24 hours.

Certain values with respect to the jet and blast are also of significance, as indicated in tables just below in which the following symbols are used.

T = Temperature
p = Pressure
V = Velocity
$\rho$ = Density

TABLE V

| | JET | |
|---|---|---|
| Symbol | Preferred Value | Range |
| $P_J$ (bar) | 2.5 | 1→50 |
| $T_J$ (° C) | 20 | 10→1100 |
| $V_J$ (m/sec) | 300 | 200→900 |
| $(\rho V^2)_J$ | 2.1 | 0.8→40 |

TABLE VI

| | BLAST | |
|---|---|---|
| Symbol | Preferred Value | Range |
| $P_B$ (mbar) | 95 | 30→250 |
| $T_B$ (° C) | 1450 | 1350→1800 |
| $V_B$ (m/s) | 320 | 200→550 |
| $(\rho V^2_B)$ (bar) | 0.2 | 0.06→0.5 |

It is to be kept in mind that where both the jet and blast are employed, it is contemplated that the jet shall preferably have a cross section smaller than that of the blast and shall penetrate the blast in order to develop a zone of interaction in which the secondary or toration phase of the attenuation will be effected. For this purpose, the jet must have greater kinetic energy than the blast, per unit of volume of the jet and blast in the operational area thereof. Typically the jet and blast may have kinetic energy ratio of 10 to 1.

The technique of the present application is of advantage for numerous reasons some of which are in common with certain of our prior applications above referred to and some of which are distinctive to the technique of the present application, and various of the advantages are of significance in connection with the fiberization of various materials and especially of thermoplastic mineral compositions such as glass and other similar materials. Thus, stability of introduction of the glass and consequent stability of the glass cone is provided, notwithstanding substantial separation of the major components of the system, including substantial separation or interspacing between the glass supply means, the jet device, and the blast generator. Separation of these components, in turn, makes possible more accurate control of the relative temperatures prevailing in or at the several components, and temperature control is desirable for effective and efficient fiberization.

The technique of the present invention also provides for development of pairs of tornadoes in the jet flow, which pairs of tornadoes are highly stable, especially in that they have their apices or points of origin within the curved trough-like jet deflector, in view of which the points or origin of the tornadoes are substantially fixed. This, in turn, provides for stability of feed of the attenuable material. The use of the individual trough-like deflectors also provides for the development of the tornadoes in each jet flow independently of the adjacent jets, and in view of this, any desired spacing of the jets may be employed.

We claim:

1. Method for transforming attenuable material into fibers by means of gaseous currents, comprising establishing at least one gaseous jet, deflecting the jet in a curved path and laterally confining it, thereby developing a pair of counter-rotating tornadoes having their apices at the lateral sides of the deflected jet flow and bordering, along their upstream portion, a zone of laminar flow located on the concave side of the path of the deflected jet flow, the material to be fiberized being delivered into the said zone of laminar flow in the form of a stream of attenuable material in attenuable condition, establishing a principal gaseous current of greater width than the jet and having a path which intersects the path of the deflected jet, the deflected jet having kinetic energy per unit of volume greater than that of the principal current so as to penetrate this current and thus create a zone of interaction containing a pair of counter-rotating tornadoes, the stream of attenuable material being entrained by the deflected jet and carried thereby into the said zone of interaction.

2. A method for attenuating attenuable material, comprising establishing a gaseous jet, developing a pair of counter-rotating tornadoes in the jet flow by deflecting the jet in a curved path and shielding the lateral sides of the deflected flow from induced air currents, thereby developing a pair of counter-rotating tornadoes with their apices adjacent said lateral sides of the curved flow and with a zone of substantially laminar flow at the concave side of the curved flow path between the upstream portions of the tornadoes, delivering a stream of attenuable material into said zone of laminar flow, establishing a gaseous blast, the jet having a cross sectional dimension smaller than the blast in a direction transversely of the blast, the blast being directed in a path intercepting the jet, and having a kinetic energy per unit of volume less than that of the jet so that the jet penetrates the blast and thereby provides a zone of interaction between the jet and blast into which the stream of attenuable material is carried by the jet.

3. A method for attenuating attenuable material, comprising establishing a gaseous blast, developing a pair of counter-rotating tornadoes in the flow of the blast by directing a gaseous jet transversely into the blast, the jet having a cross sectional dimension smaller than that of the blast in a direction transverse to the blast and the jet having kinetic energy per unit of volume greater than that of the blast, in a region of the jet upstream of the blast developing a pair of counter-rotating tornadoes having a pair of whirling currents which describe a path substantially equal to the cross section of the jet, and the tornadoes having axes generally paralleling the axis of the jet and with a zone of substantially laminar flow between the tornadoes toward one side of the jet, the directions of turning of the tornadoes of the jet corresponding to the directions of turning of the tornadoes in the blast, and delivering a stream of attenuable material to the jet in said zone of laminar flow.

4. A method as defined in claim 3 in which the tornadoes in the jet flow are developed in a region adjoining the blast and in which the tornadoes in the jet flow merge with the tornadoes in the blast.

5. Apparatus for use in fiberizing attenuable material comprising means for establishing a gaseous blast, means for establishing a gaseous jet, a jet deflector in the path of the jet, the deflector comprising a trough shaped element receiving the jet toward one end thereof, said element being concavely curved axially of the trough, the deflector being positioned to direct the jet transversely into the blast, and means for feeding a stream of attenuable material into the influence of the jet in the region in which the jet is flowing through the trough of the deflector element.

6. Apparatus for use in fiberizing attenuable material comprising means for establishing a gaseous blast, means for establishing a gaseous jet, a jet deflector in the path of the jet, the deflector having a deflecting surface concavely curved along the jet flow path, the deflector being positioned to direct the jet transversely into the blast, and means for feeding a stream of attenuable material into the influence of the jet in the region of said deflector.

7. Apparatus as defined in claim 6 in which the delivery end of the trough shaped deflector element is located in a position adjoining the boundary of the blast.

* * * * *